W. STAVER.
SEED DRILL ATTACHMENT.
APPLICATION FILED DEC. 6, 1917.
1,293,568.
Patented Feb. 4, 1919.
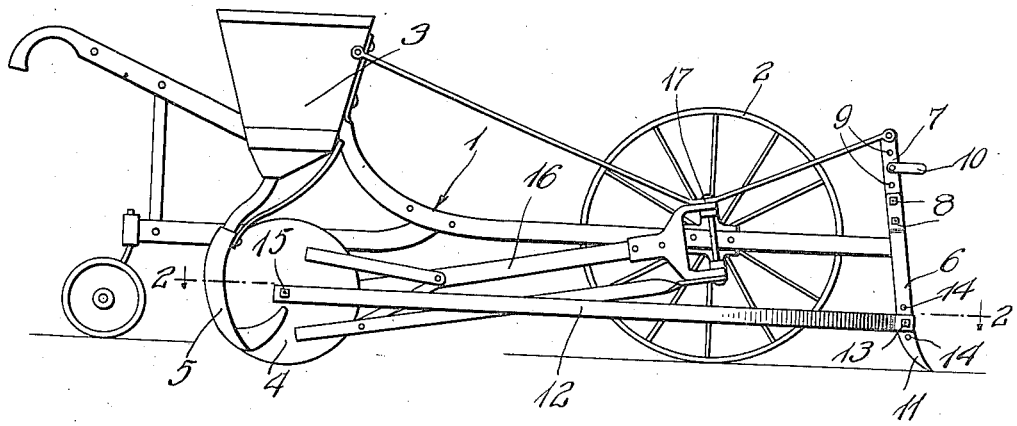
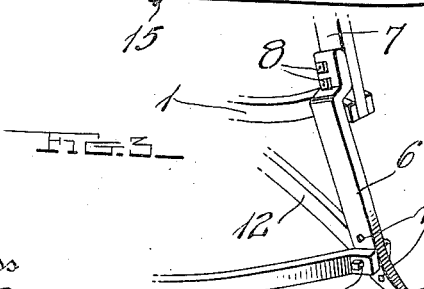
Witness
J. R. Pierce
Inventor
W. Staver
By H. B. Willson & Co.
Attorneys

UNITED STATES PATENT OFFICE.

WILLIAM STAVER, OF URBANA, INDIANA.

SEED-DRILL ATTACHMENT.

1,293,568.   Specification of Letters Patent.   Patented Feb. 4, 1919.

Application filed December 6, 1917. Serial No. 205,763.

*To all whom it may concern:*

Be it known that I, WILLIAM STAVER, a citizen of the United States, residing at Urbana, in the county of Wabash and State of Indiana, have invented certain new and useful Improvements in Seed-Drill Attachments; and I do declare the following to be a full, clear, and exact description of the invention, such as will enable others skilled in the art to which it appertains to make and use the same.

My invention relates to improvements in that class of seed drills designed for seeding between rows of corn, and the object is to provide a simply constructed and inexpensive attachment for lifting any fallen stalks of corn and throwing them outwardly from the path of the seeding means, thus preventing such stalks from interfering with the seeding operation.

With the foregoing general object in view, the invention resides in the novel features of construction and unique combinations of parts to be hereinafter fully described and claimed, the descriptive matter being supplemented by the accompanying drawings which form a part of this specification and in which:

Figure 1 is a side elevation of a seed drill showing the application of the invention;

Fig. 2 is a horizontal section on substantially the plane of the line 2—2 of Fig 1; and Fig. 3 is a detail perspective view of the front end of the attachment and the seeder frame.

In the drawings above briefly described, the numeral 1 designates the frame of a seed drill for seeding between rows of corn or other crops, the front end of said frame having the usual wheel 2 while the seeding mechanism is located near the rear of the frame and consists briefly of a seed hopper 3, disks 4 for pulverizing the earth and forming furrows in which the seed are planted, and seeding shoes 5 for depositing the seed in said furrows. This type of drill is provided with any suitable covering means but the latter is eliminated from the present showing since it forms no part of the invention.

Drills of the class above described, are very efficient unless they encounter fallen stalks of corn. When this occurs, the disks 4 are intended to cut said stalks but in most instances they are not sufficiently sharp and the weight of the machine is not great enough to perform such a cutting function, the result being that the disks ride over the stalks and cause the shoes 5 to deposit the seed upon the top of the earth rather than below the surface thereof. A great deal of seed is thus wasted but such waste is effectively overcome by the use of the invention forming the subject matter of the present case.

I attach the upper end of a substantially vertical bar 6 to the hitch 7 or any other suitable part of the frame 1 at the front end of the latter, bolts 8 being preferably provided for this purpose, and said bolts may well pass through the usual openings 9 formed in the hitch 7 for adjustment of the clevis 10. The lower end of bar 6 is preferably pointed and turned forwardly to provide a nose 11 adapted to lift any fallen corn stalks in the path of the machine. In order to force such stalks outwardly, a pair of rearwardly diverging bars 12 are provided, the front ends of said bars being secured against opposite sides of the bar 6 by a bolt or the like 13 which may pass through any one of a number of vertically spaced openings 14, as occasion may demand. The rear ends of the bars 12 straddle the series of disks 4 and are provided with openings through which the axle bolts 15 of the outermost disks pass, whereby said bars are supported.

The beams 16 of the outer disks 4 are pivotally mounted at 17 to permit inward yielding in case stalks of corn out of alinement with the others are encountered, and whenever such an inward movement should be necessary, the bars 12 will assist, said bars being sufficiently resilient to offer no obstruction to the intended operation.

From the foregoing, taken in connection with the accompanying drawing, it will be obvious that as the drill is drawn between the rows of corn, any fallen stalks will be lifted by the nose 11 and forced out of the path of the drilling mechanism by the rearwardly diverging bars 12, thus preventing such stalks from in any manner interfering with the drilling operation. Much better results are thus obtained so that the efficiency of the machine is greatly increased. Regardless of these characteristics, however, the attachment is extremely simple and inexpensive and may be easily applied without skilled labor.

Since probably the best results are obtained from the specific details shown and described, such details are preferably employed, but I wish it understood that within the scope of the invention as claimed, numerous minor changes may well be made.

I claim:

1. The combination with an earth working implement having a transverse series of disks for operating between rows of corn, said implement having a frame extending forwardly from said disks; a vertical bar secured to the front end of said frame and depending therefrom, said bar having a forwardly curved lower end to raise any fallen corn stalks, a pair of longitudinal bars secured at their rear ends to the axle bolts of the outermost disks, said bars extending straight forwardly from said bolts in substantially parallel relation and having their front ends curved inwardly, and means securing said front ends of said pair of bars to said first named bar.

2. An attachment for implements having disks adapted to operate between rows of corn, said attachment comprising a vertical bar having its upper end offset laterally and provided with bolt holes, the lower end of said bar being pointed, curved forwardly and provided with vertically spaced bolt holes, a pair of longitudinal bars having bolt holes at their rear ends adapted to receive the axle bolts of the implement disks, the rear portions of said bars being parallel and the front ends thereof being curved inwardly toward each other and contacting with opposite sides of said first named bar, and a bolt passing through said front ends of said horizontal bars and through one of said plurality of vertically spaced openings.

In testimony whereof I have hereunto set my hand in the presence of two subscribing witnesses.

WILLIAM STAVER.

Witnesses:
RUSKIN B. PHILLIPS,
HELEN MAURER.